(12) United States Patent
Yokoyama et al.

(10) Patent No.: US 11,795,300 B2
(45) Date of Patent: Oct. 24, 2023

(54) ADDITIVE COMPOSITION, POLYOLEFIN RESIN COMPOSITION CONTAINING SAME, METHOD FOR PRODUCING POLYOLEFIN RESIN COMPOSITION, AND MOLDED ARTICLES THEREOF

(71) Applicant: ADEKA CORPORATION, Tokyo (JP)

(72) Inventors: Ryo Yokoyama, Saitama (JP); Yuri Yokota, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 17/263,496

(22) PCT Filed: Jul. 18, 2019

(86) PCT No.: PCT/JP2019/028320
§ 371 (c)(1),
(2) Date: Jan. 26, 2021

(87) PCT Pub. No.: WO2020/022189
PCT Pub. Date: Jan. 30, 2020

(65) Prior Publication Data
US 2021/0214525 A1   Jul. 15, 2021

(30) Foreign Application Priority Data
Jul. 27, 2018  (JP) ................. 2018-140920

(51) Int. Cl.
*C08K 5/527* (2006.01)
*C08K 5/1575* (2006.01)

(52) U.S. Cl.
CPC ............ *C08K 5/1575* (2013.01); *C08K 5/527* (2013.01)

(58) Field of Classification Search
CPC ..................................... C08K 5/527
See application file for complete search history.

(56) References Cited

U.S. PATENT DOCUMENTS

| 4,463,113 A * | 7/1984 | Nakahara ............ C07F 9/65744 |
| | | 252/400.1 |
| 9,249,267 B2 * | 2/2016 | Yokota ..................... C08J 3/226 |
| 2011/0105657 A1 | 5/2011 | Tanji et al. |
| 2013/0065994 A1 | 3/2013 | Yokota et al. |
| 2014/0005310 A1 | 1/2014 | Gerster et al. |
| 2016/0122508 A1 | 5/2016 | Sakai et al. |
| 2018/0072931 A1 | 3/2018 | Cui et al. |

FOREIGN PATENT DOCUMENTS

| CN | 105131334 A | 12/2015 |
| CN | 107429048 A | 12/2017 |
| EP | 3 196 235 A1 | 7/2017 |
| JP | 2009-120798 A | 6/2009 |
| JP | 2009-120800 A | 6/2009 |
| JP | 2011-246589 A | 12/2011 |
| JP | 2015-201616 A | 11/2015 |
| JP | 2017-171884 A | 9/2017 |
| WO | WO 2012/123928 A1 | 9/2012 |
| WO | WO 2014/192813 A1 | 12/2014 |
| WO | WO 2016/043172 A1 | 3/2016 |

OTHER PUBLICATIONS

International Search Report for PCT/JP2019/028320 (PCT/ISA/210) dated Oct. 1, 2019.
Written Opinion of the International Searching Authority for PCT/JP2019/028320 (PCT/ISA/237) dated Oct. 1, 2019.
Extended European Search Report for corresponding European Application No. 19841759.4, dated Mar. 30, 2022.

* cited by examiner

*Primary Examiner* — Vickey Nerangis
(74) *Attorney, Agent, or Firm* — Birch, Stewart, Kolasch & Birch, LLP

(57) ABSTRACT

Provided are: an additive composition which has an excellent extruder feed stability as a result of having an excellent powder flowability, and can impart excellent transparency and mechanical properties to molded articles; a polyolefin resin composition containing the additive composition; a method of producing a polyolefin resin composition; and a molded article of the polyolefin resin composition. The additive composition contains (A) 1-[8-propyl-2,6-bis(4-propylphenyl)tetrahydro[1,3]dioxino[5,4-d]-1,3-dioxin-4-yl]ethane-1,2-diol and (B) an aromatic phosphate metal salt represented by Formula (1) where $R^1$ to $R^4$ each independently represent an alkyl group having 1 to 6 carbon atoms; n represents a number of 1 or 2; when n is 1, $M^1$ represents an alkali metal; and when n is 2, $M^1$ represents hydroxyaluminum. In this additive composition, the mass ratio of (A) and (B), (A)/(B), is in a range of 10/90 to 90/10.

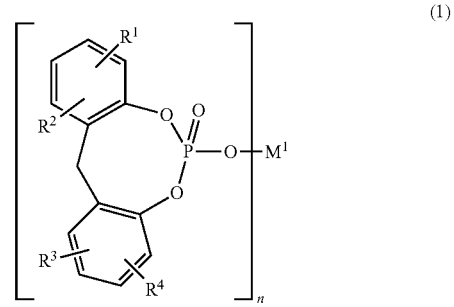

(1)

10 Claims, No Drawings

ADDITIVE COMPOSITION, POLYOLEFIN RESIN COMPOSITION CONTAINING SAME, METHOD FOR PRODUCING POLYOLEFIN RESIN COMPOSITION, AND MOLDED ARTICLES THEREOF

TECHNICAL FIELD

The present invention relates to an additive composition, a polyolefin resin composition containing the same, a method of producing a polyolefin resin composition, and a molded article of the polyolefin resin composition. More particularly, the present invention relates to: an additive composition which has an excellent extruder feed stability as a result of having an excellent powder flowability, and can impart excellent transparency and mechanical properties to molded articles; a polyolefin resin composition containing the additive composition; a method of producing a polyolefin resin composition; and a molded article of the polyolefin resin composition.

BACKGROUND ART

Polyolefin resins, such as polyethylene, polypropylene and polybutene-1, are inexpensive and have excellent properties in terms of moldability, hygiene, heat resistance, chemical resistance, mechanical characteristics, low specific gravity, and the like; therefore, they are widely utilized in a variety of molded articles, such as building materials, automobile materials, materials of household electric appliances and electronics, fiber materials, packaging materials, agricultural materials, housing materials of home electric appliances, household miscellaneous goods, medical equipment, food containers, beverage containers, films, sheets, and structural components. With an addition of a clarifying agent, polyolefin resins can yield molded articles having excellent transparency.

Particularly, 1-[8-propyl-2,6-bis(4-propylphenyl)tetrahydro[1,3]dioxino[5,4-d]-1,3-dioxin-4-yl]ethane-1,2-diol is known as a nonitol-based clarifying agent which has a prominent effect of improving the transparency of polyolefins. Examples of commercially available products of this compound include MILLAD NX 8000 and NX 8000J, which are manufactured by Milliken & Company.

Under these circumstances, Patent Document 1 discloses that a molded article in which "NX 8000J" is incorporated into a propylene-based polymer exhibits excellent transparency. In addition, Patent Document 2 discloses a polypropylene film suitable for capacitor applications, which polypropylene film is capable of maintaining high voltage resistance and reliability even in a high-temperature environment as a capacitor dielectric and contains "NX 8000". Further, Patent Document 3 discloses the structure of 1-[8-propyl-2,6-bis(4-propylphenyl)tetrahydro[1,3]dioxino[5,4-d]-1,3-dioxin-4-yl]ethane-1,2-diol.

RELATED ART DOCUMENTS

Patent Documents

[Patent Document 1] JP2017-171884A
[Patent Document 2] WO2016/043172A1
[Patent Document 3] WO2014/192813A1

SUMMARY OF THE INVENTION

Problems to be Solved by the Invention

Nonitol-based clarifying agents have a problem in that they have a poor flowability as powder although they impart an excellent transparency-improving effect to polyolefin resins. Specifically, there is a problem that the supply of a nonitol-based clarifying agent to an extruder is unstable due to blocking in a hopper of the extruder, resulting in an increased occurrence of defective products.

In view of the above, an object of the present invention is to provide: an additive composition which has an excellent extruder feed stability as a result of having an excellent powder flowability, and can impart excellent transparency and mechanical properties to molded articles; a polyolefin resin composition containing the additive composition; a method of producing a polyolefin resin composition; and a molded article of the polyolefin resin composition.

Means for Solving the Problems

The present inventors intensively studied to solve the above-described problems and consequently discovered that an additive composition in which a prescribed aromatic phosphate metal salt is used in combination with a nonitol-based clarifying agent has an excellent powder flowability, and that a polyolefin resin composition containing such an additive composition can yield a molded article having excellent transparency and physical properties, thereby completing the present invention.

That is, the additive composition of the present invention is an additive composition containing: (A) 1-[8-propyl-2,6-bis(4-propylphenyl)tetrahydro[1,3]dioxino[5,4-d]-1,3-dioxin-4-yl]ethane-1,2-diol; and (B) an aromatic phosphate metal salt represented by the following Formula (1):

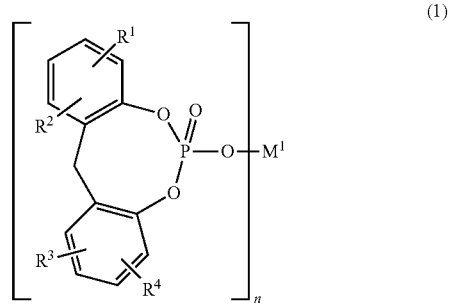

where $R^1$ to $R^4$ each independently represent an alkyl group having 1 to 6 carbon atoms; n represents a number of 1 or 2; when n is 1, $M^1$ represents an alkali metal; and when n is 2, $M^1$ represents hydroxyaluminum, the additive composition being characterized in that a mass ratio of (A) and (B), (A)/(B), is in a range of 10/90 to 90/10.

It is preferred that the additive composition of the present invention further containing at least one additive selected from a phenolic antioxidant, a phosphorus-based antioxidant, a thioether-based antioxidant, a hindered amine compound, an ultraviolet absorber, a nucleating agent different from the (A) and the (B), a flame retardant, a flame retardant aid, a lubricant, a filler, a hydrotalcite, a fatty acid metal salt, an antistatic agent, a pigment, and a dye. Further, in the additive composition of the present invention, it is preferred that the fatty acid metal salt be a compound represented by the following Formula (2):

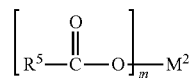

(2)

where $R^5$ represents a linear or branched alkyl group having 12 to 20 carbon atoms, which alkyl group is optionally substituted with a hydroxy group; $M^2$ represents an m-valent metal atom or $Al(OH)_{3-m}$; and m represents an integer of 1 to 3.

A polyolefin resin composition of the present invention is characterized by containing the additive composition of the present invention such that the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 parts by mass of a polyolefin resin.

A method of producing a polyolefin resin composition according to the present invention is characterized by including: preparing the additive composition of the present invention; and incorporating the thus prepared additive composition into a polyolefin resin such that the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 parts by mass of the polyolefin resin.

A molded article of the present invention is characterized by containing the polyolefin resin composition of the present invention.

Effects of the Invention

According to the present invention, an additive composition which has an excellent extruder feed stability as a result of having an excellent powder flowability, and can impart excellent transparency and mechanical properties to molded articles; a polyolefin resin composition containing the additive composition; a method of producing a polyolefin resin composition; and a molded article of the polyolefin resin composition can be provided. The additive composition of the present invention has an excellent extruder feed stability and, therefore, can improve the productivity and the quality stability in a kneading-extrusion process.

Mode for Carrying Out the Invention

Embodiments of the present invention will now be described in detail.

The additive composition of the present invention is an additive composition containing: (A) 1-[8-propyl-2,6-bis(4-propylphenyl)tetrahydro[1,3]dioxino[5,4-d]-1,3-dioxin-4-yl]ethane-1,2-diol; and (B) an aromatic phosphate metal salt represented by Formula (1) below, and the mass ratio of (A) and (B), (A)/(B), is in a range of 10/90 to 90/10.

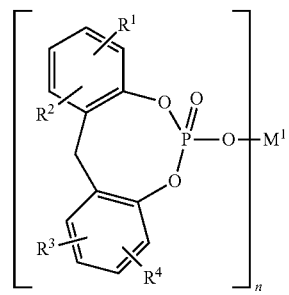

(1)

In Formula (1), $R^1$ to $R^4$ each independently represent an alkyl group having 1 to 6 carbon atoms; n represents a number of 1 or 2; when n is 1, $M^1$ represents an alkali metal; and when n is 2, $M^1$ represents hydroxyaluminum.

The additive composition of the present invention has an excellent powder flowability. As a result, the additive composition of the present invention exhibits an excellent extruder feed stability. In addition, the additive composition of the present invention can impart excellent transparency and mechanical properties to molded articles.

Examples of the alkyl group having 1 to 6 carbon atoms which is represented by $R^1$ to $R^4$ in Formula (1) include methyl, ethyl, n-propyl, isopropyl, n-butyl, isobutyl, sec-butyl, tert-butyl, pentyl, hexyl, and cyclohexyl. In the additive composition of the present invention, the alkyl group is particularly preferably tert-butyl since this allows the compound to have an excellent thermal stability.

Further, examples of the alkali metal represented by $M^1$ in Formula (1) include lithium sodium, and potassium.

Examples of the (B) aromatic phosphate metal salt used in the additive composition of the present invention include the following compounds. It is noted here, however, that the additive composition of the present invention is not restricted by the following compounds:

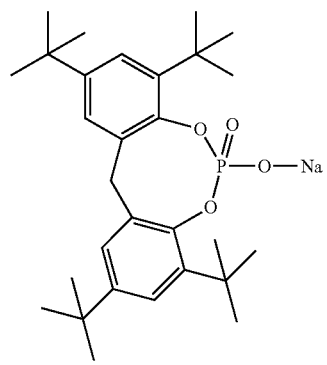

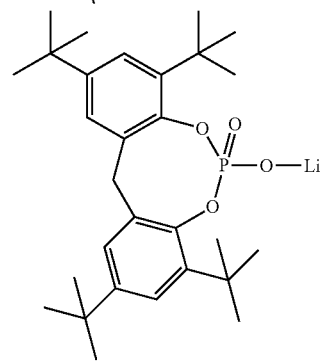

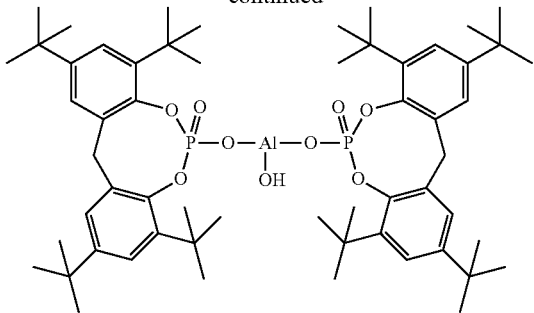

In the additive composition of the present invention, the component (B) may be a single compound, or a combination of plural compounds.

In the additive composition of the present invention, the mass ratio of the component (A) and the component (B), (A)/(B), is in a range of 10/90 to 90/10. When the mass ratio (A)/(B) is higher than 90/10, the additive composition does not have sufficient powder flowability. Meanwhile, when the mass ratio (A)/(B) is lower than 10/90, the additive composition cannot impart sufficient transparency to a molded article. From the standpoint of obtaining an additive composition having superior powder flowability, the mass ratio (A)/(B) is preferably 80/20 to 20/80, more preferably 70/30 to 30/70.

The additive composition of the present invention can be preferably used as an additive to be incorporated into a polyolefin resin.

The additive composition of the present invention preferably further contains an additive(s), such as a phenolic antioxidant, a phosphorus-based antioxidant, a thioether-based antioxidant, a hindered amine compound, an ultraviolet absorber, a nucleating agent different from the above-described (A) and (B), a flame retardant, a flame retardant aid, a lubricant, a filler, a hydrotalcite, a fatty acid metal salt, an antistatic agent, a pigment, and/or a dye. The content of these additives is not particularly restricted; however, when the additive composition of the present invention is incorporated into a polyolefin resin, these additives are preferably contained in such an amount that they each exist at an appropriate concentration in the polyolefin resin.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl) propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxybenzenepropanoic acid and a C13-15 alkyl, 2,5-di-tert-amylhydroquinone, hindered phenol polymers (e.g., trade name "AO.OH.98" manufactured by ADEKA Polymer Additives Europe SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl) propionate, calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-α-tocophenol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazane 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate. 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-tert-butyl-4'-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5,5]undecane, triethylene glycol-bis [β-(3-tert-butyl-4-hydroxy-5-methylphenyl)propionate], and 3-(3,5-dialkyl-4-hydroxyphenyl)propionic acid derivatives, such as stearyl-3-(3,5-di-tert-butyl-4-hydroxyphenyl) propionic acid amide, palmityl-3-(3,5-di-tert-butyl-4-hydroxyphenyl)propionic acid amide, myristyl-3-(3,5-di-tert-butyl-4-hydroxyphenyl)propionic acid amide, and lauryl-3-(3,5-di-tert-butyl-4-hydroxyphenyl)propionic acid amide. In cases where a phenolic antioxidant is incorporated, the amount thereof is preferably adjusted such that, when the additive composition is blended into a polyolefin resin, the content of the phenolic antioxidant is 0.001 to 5 parts by mass, more preferably 0.03 to 3 parts by mass, with respect to 100 parts by mass of the polyolefin resin.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis (nonylphenyl)phosphite, poly(dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, mixtures of distearyl pentaerythritol and calcium stearate, alkyl(C10) bisphenol-A phosphite, tetraphenyl-tetra(tridecyl)pentaerythritol tetraphosphite, bis(2,4-di-tert-butyl-6-methylphenyl) ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris (2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene)tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, bis(diisodecyl)pentaerythritol diphosphite, bis(tridecyl)pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis(2,4,6-tri-tert-butylphenyl)pentaerythritol diphosphite, bis(2,6-di-tert-butyl-4-methylphenyl)pentaerythritol diphosphite, and bis(2,4-dicumylphenyl)pentaerythritol diphosphite. In cases where a phosphorus-based antioxidant is incorporated, the amount thereof is preferably adjusted such that, when the additive composition is blended into a polyolefin resin, the content of the phosphorus-based antioxidant is 0.001 to 10 parts by mass, more preferably 0.01 to 0.5 parts by mass, with respect to 100 parts by mass of the polyolefin resin.

Examples of the thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), and distearyl disulfide. In cases where a thioether-based antioxidant is incorporated, the amount thereof is preferably adjusted such that, when the additive composition is blended into a polyolefin resin, the content of the thioether-based antioxidant is 0.001 to 10 parts by mass, more preferably 0.01 to 0.5 parts by mass, with respect to 100 parts by mass of the polyolefin resin.

Examples of the ultraviolet absorber include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenylacrylate and methyl-2-cyano-3-methyl-3-(p-methoxyphenyl)acrylate; triazines, such as 2-(4,6-diphenyl-1,3,5-triazine-2-yl)-5-hexyloxyphenol, 2-(2-hydroxy-4-octoxyphenyl)-4,6-bis(2,4-dimethylphenyl)-1,3,5-triazine, trioctyl-2,2',2"-((1,3,5-triazine-2,4,6-triyl)tris(3-hydroxybenzene-4-,1-diyl)tripropionate), 2-(4,6-diphenyl-1,3,5-triazine-2-yl)-5-[2-(2-ethylhexanoyloxy)ethoxy]phenol, 2,4,6-tris(2-hydroxy-4-hexyloxy-3-methylphenyl)-1,3,5-triazine, and 1,12-bis[2-[4-(4,6-diphenyl-1,3,5-triazine-2-yl)-3-hydroxyphenoxy]ethyl] dodecane dioate; and a variety of metal salts and metal chelates, particularly salts and chelates of nickel and chromium. In cases where an ultraviolet absorber is incorporated, the amount thereof is preferably adjusted such that, when the additive composition is blended into a polyolefin resin, the content of the ultraviolet absorber is 0.001 to 10 parts by mass, more preferably 0.01 to 0.5 parts by mass, with respect to 100 parts by mass of the polyolefin resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]amino undecane, bis{4-(1-octyloxy-2,2,6,6-tetramethyl)piperidyl}decanedionate, and bis{4-(2,2,6,6-tetramethyl-1-undecyloxy)piperidyl)carbonate. In cases where a hindered amine compound is incorporated, the amount thereof is preferably adjusted such that, when the additive composition is blended into a polyolefin resin, the content of the hindered amine compound is 0.001 to 10 parts by mass, more preferably 0.01 to 0.5 parts by mass, with respect to 100 parts by mass of the polyolefin resin.

Examples of the nucleating agent (containing a compound different from one represented by Formula (1)) include metal carboxylates, such as sodium benzoate, 4-tert-butylbenzoate aluminum salt, sodium adipate, and 2-sodium-bicyclo[2.2.1]heptane-2,3-dicarboxylate; polyol derivatives, such as dibenzylidene sorbitol, bis(methylbenzylidene)sorbitol, bis(3,4-dimethylbenzylidene)sorbitol, bis(p-ethylbenzylidene)sorbitol, and bis(dimethylbenzylidene)sorbitol; and amide compounds, such as N,N',N''-tris[2-methylcyclohexyl]-1,2,3-propane tricarboxamide, N,N',N''-tricyclohexyl-1,3,5-benzene tricarboxamide, N,N-dicyclohexylnaphthalene dicarboxamide, and 1,3,5-tri(dimethylisopropoylamino)benzene. In cases where a nucleating agent is incorporated, the amount thereof is preferably adjusted such that, when the additive composition is blended into a polyolefin resin, the content of the nucleating agent is 0.03 to 10 parts by mass, more preferably 0.05 to 0.5 parts by mass, with respect to 100 parts by mass of the polyolefin resin.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, and 1,3-phenylene-tetrakis(2,6-dimethylphenyl)phosphate, as well as "ADK STAB FP-500", "ADK STAB FP-600" and "ADK STAB FP-800" (trade names, manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or hydrotalcite. In cases where a flame retardant is incorporated, the amount thereof is preferably adjusted such that, when the additive composition is blended into a polyolefin resin, the content of the flame retardant is 1 to 100 parts by mass, more preferably 10 to 70 parts by mass, with respect to 100 parts by mass of the polyolefin resin.

A lubricant is added for the purposes of imparting the surface of the resulting molded article with lubricity and improving the damage-preventing effect. Examples of the lubricant include unsaturated fatty acid amides, such as oleic acid amide and erucic acid amide; saturated fatty acid amides, such as behenic acid amide and stearic acid amide; butyl stearate; stearyl alcohol; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be used individually, or two or more thereof may be used in combination. In cases where a lubricant is incorporated, the amount thereof is preferably adjusted such that, when the additive composition is blended into a polyolefin resin, the content of the lubricant is 0.01 to 2 parts by mass, more preferably 0.03 to 0.5 parts by mass, with respect to 100 parts by mass of the polyolefin resin.

The above-described hydrotalcite is a complex salt compound which is known as a natural or synthetic product and composed of magnesium, aluminum, hydroxy groups, a carbonate group and arbitrary crystal water, and examples thereof include hydrotalcites in which some of the magnesium or aluminum atoms are substituted with other metal such as an alkali metal or zinc; and hydrotalcites in which the hydroxy group(s) and/or carbonate group is/are substituted with other anionic group(s), specifically hydrotalcites represented by the following Formula (3) in which a metal is substituted with an alkali metal. In addition, as an Al—Li hydrotalcite, a compound represented by Formula (4) below can be used as well.

$$Mg_{x1}Zn_{x2}Al_2(OH)_{2(x1+x2)+4}(CO_3)pH_2O \qquad (3)$$

In Formula (3), x1 and x2 each represent a number that satisfies the conditions represented by the following equations:

$$0 \leq x2/x1 < 10, 2 \leq (x1+x2) \leq 20,$$

and p represents 0 or a positive number.

$$[Li_{1/3}Al_{2/3}(OH)_2] \cdot [A^{q-}_{1/3q} \cdot pH_2O] \qquad (4)$$

In Formula (4), $A^{q-}$ represents a q-valent anion, and p represents 0 or a positive number.

Further, the carbonate anions in these hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcites may be naturally-occurring or synthetic hydrotalcites. Examples of a synthesis method thereof include known methods that are described in JPS46-2280B1, JJPS50-30039B1, JPS51-29129B1, JPH03-36839A, JPS61-174270A, JPH05-179052A, and the like. Further, the above-exemplified hydrotalcites can be used without any restriction in terms of their crystal structures, crystal particles and the like. In cases where a hydrotalcite is incorporated, the amount thereof is preferably adjusted such that, when the additive composition is blended into a polyolefin resin, the content of the hydrotalcite is 0.001 to 5 parts by mass, more preferably 0.01 to 3 parts by mass, with respect to 100 parts by mass of the polyolefin resin.

Examples of a fatty acid used in the fatty acid metal salt include saturated fatty acids, such as butyric acid, valeric acid, caproic acid, enanthic acid, caprylic acid, pelargonic acid, 2-ethylhexanoic acid, capric acid, lauric acid, myristic acid, pentadecylic acid, palmitic acid, margaric acid, isostearic acid, stearic acid, 12-hydroxystearic acid, arachidic acid, heneicosylic acid, behenic acid, lignoceric acid, and montanoic acid; monounsaturated fatty acids, such as crotonic acid, myristoleic acid, palmitoleic acid, sapienic acid, oleic acid, elaidic acid, vaccenic acid, gadoleic acid, eicosenoic acid, erucic acid, and nervonic acid; diunsaturated fatty acids, such as linoleic acid, eicosadienoic acid, and docosadienoic acid; and unsaturated fatty acids having three or more unsaturated bonds, such as linolenic acid, pinolenic acid, eleostearic acid, mead acid, eicosatrienoic acid, stearidonic acid, arachidonic acid, eicosatetraenoic acid, adrenic acid, and docosahexaenoic acid. In the additive composition of the present invention, a fatty acid having 12 to 20 carbon atoms such as lauric acid, myristic acid, or stearic acid is more preferred.

Examples of a metal used in the fatty acid metal salt include sodium, potassium, lithium, calcium, zinc, barium, magnesium and aluminum, and the metal may be a metal atom having a hydroxy group.

Among such fatty acid metal salts, a compound represented by Formula (2) below is preferred from the standpoint of attaining heat resistance and dispersion effect of the nucleating agent in a resin.

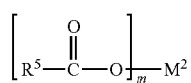

(2)

In Formula (2), $R^5$ represents a linear or branched alkyl group having 12 to 20 carbon atoms, which alkyl group is optionally substituted with a hydroxy group; $M^2$ represents an m-valent metal atom or $Al(OH)_{3-m}$; and m represents an integer of 1 to 3.

In Formula (2), specific examples of $M^2$ include sodium, potassium, lithium, calcium, zinc, barium, magnesium, aluminum, hydroxyaluminum and dihydroxyaluminum, and $M^2$ is particularly preferably sodium, lithium, or potassium.

In the additive composition of the present invention, the content of the fatty acid metal salt is preferably 5 to 50% by mass, more preferably 10 to 35% by mass, with respect to the component (B).

Examples of the antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents, such as polyhydric alcohol fatty acid esters, polyglycol phosphates, and polyoxyethylene alkyl allyl ethers; amphoteric antistatic agents, such as amphoteric alkyl betaines (e.g., alkyldimethylamino acetic acid betaines) and imidazoline-type amphoteric activators; and polymer-type antistatic agents, such as polyether ester amides. These antistatic agents may be used individually, or two or more thereof may be used in combination. In cases where an antistatic agent is incorporated, the amount thereof is preferably adjusted such that, when the additive composition is blended into a polyolefin resin, the content of the antistatic agent is 0.03 to 2 parts by mass, more preferably 0.1 to 0.8 parts by mass, with respect to 100 parts by mass of the polyolefin resin.

As the above-described pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50.

A fluorescent brightener is a compound which enhances the whiteness or blueness of a molded article by a fluorescent action of absorbing ultraviolet rays of solar light and artificial light, converting the absorbed ultraviolet rays into visible light of purple to blue, and radiating the visible light. Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostilbene disulfonic acid-based compounds. In cases where a fluorescent brightener is used, the amount thereof is preferably adjusted such that, when the additive composition is blended into a polyolefin resin, the content of the fluorescent brightener is 0.00001 to 0.1 parts by mass, more preferably 0.00005 to 0.05 parts by mass, with respect to 100 parts by mass of the polyolefin resin.

Examples of the dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be mixed and used in combination.

A method of producing the additive composition of the present invention is not particularly restricted and, for example, any method in which (A) 1-[8-propyl-2,6-bis(4-propylphenyl)tetrahydro[1,3]dioxino[5,4-d]-1,3-dioxin-4-yl]ethane-1,2-diol, (B) an aromatic phosphate metal salt and, as required, other additive(s) are added and blended using a known mixing machine such as a Henschel mixer may be employed. The additive composition of the present invention may also be produced by a method in which, after further adding a polymer compound and a binder such as a petroleum resin to the above-described components, these materials are mixed while being heated to the melting point of the binder and subsequently made into a pellet form. In this production method, the processing conditions, the processing equipment and the like are not restricted at all, and any well-known and commonly-used processing conditions and processing equipment can be used. Specific examples of this production method include a disk pelleter method and an extrusion method.

Next, the polyolefin resin composition of the present invention will be described. The polyolefin resin composition of the present invention is obtained by incorporating the additive composition of the present invention into a polyolefin resin. In the polyolefin resin composition of the present invention, the additive composition is incorporated such that the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 parts by mass of the polyolefin resin. The polyolefin resin composition of the present invention can impart excellent transparency and mechanical properties to its molded article. Further, the polyolefin resin composition of the present invention provides excellent productivity and quality stability in a kneading-extrusion process.

As described above, in the polyolefin resin composition of the present invention, the additive composition is incorporated such that the content of (A) 1-[8-propyl-2,6-bis(4-propylphenyl)tetrahydro[1,3]dioxino[5,4-d]-1,3-dioxin-4- yl]ethane-1,2-diol is 0.001 to 0.8 parts by mass with respect to 100 parts by mass of the polyolefin resin. When the additive composition is incorporated such that the content of the component (A) is less than 0.001 parts by mass, the resulting molded article cannot be provided with sufficient transparency in some cases, whereas when the additive composition is incorporated such that the content of the component (A) is greater than 0.8 parts by mass, an effect of adding the additive composition is not obtained, which is uneconomical. The additive composition is preferably incorporated such that the content of the component (A) is 0.01 to 0.5 parts by mass with respect to 100 parts by mass of the polyolefin resin. In this case, the polyolefin resin composition can impart superior transparency and mechanical properties to its molded article.

The polyolefin resin used in the polyolefin resin composition of the present invention is not particularly restricted. Examples thereof include: α-olefin polymers, such as low-density polyethylenes (LDPE), linear low-density polyethylenes (L-LDPE), high-density polyethylenes (HDPE), isotactic polypropylenes, syndiotactic polypropylenes, hemi-isotactic polypropylenes, cycloolefin polymers, stereo block polypropylenes, poly-3-methyl-1-butenes, poly-3-methyl-1-pentenes, and poly-4-methyl-1-pentenes; and α-olefin copolymers, such as ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers, ethylene-vinyl acetate copolymers and ethylene-vinyl alcohol resins (EVOH), and an elastomer composed of the polyolefin resin may be used as well. In the polyolefin resin composition of the present invention, two or more of the above-described resins may be blended, may form a block copolymer to be used as a block polymer-type resin, or may be alloyed. Further, the polyolefin resin may be a chlorination product of any of the above-described polyolefin resins.

Examples of the elastomer composed of the polyolefin resin include elastomers obtained by blending a polyolefin (e.g., polypropylene or polyethylene) as a hard segment and a rubber (e.g., ethylene-propylene rubber) as a soft segment, and elastomers obtained by dynamic cross-linking. The hard segment is, for example, at least one selected from polypropylene homopolymers, polypropylene block copolymers, polypropylene random copolymers and the like. Examples of the soft segment include ethylene-propylene copolymers (EPM), ethylene-propylene-diene copolymers (EPDM), ethylene-vinyl acetate copolymers (EVA), and vinyl acetate homopolymers. Two or more of these polymers may be used as a blend.

As for a method of producing the above-described polyolefin resin, the polyolefin resin can be produced by appropriately selecting the polymerization conditions (e.g., temperature, pressure, concentration, flow rate, and removal of catalyst residue) that yield a resin having physical properties suitable for a packaging material or a resin having physical properties suitable for molding of a packaging material in a variety of polymerization methods such as vapor-phase polymerization, solution polymerization, emulsion polymerization and bulk polymerization that include the use of various polymerization catalysts (e.g., Ziegler catalysts. Ziegler-Natta catalysts, and metallocene catalysts), co-catalysts, catalyst carriers and chain transfer agents. Other properties of the polyolefin resin, such as number-average molecular weight, weight-average molecular weight, molecular weight distribution, melt flow rate, melting point, melting peak temperature, stereoregularity (e.g., isotacticity or syndiotacticity), presence/absence and degree of branching, specific gravity, ratio of a component(s) dissolving in various solvents, haze, gloss, impact strength, flexural modulus and Olsen rigidity, as well as whether or not the respective property values satisfy a specific formula, can be selected as appropriate in accordance with the desired properties.

In the polyolefin resin composition of the present invention, for example, any known additive(s) (e.g., a phenolic antioxidant, a phosphorus-based antioxidant, a thioether-based antioxidant, other antioxidant, a hindered amine compound, an ultraviolet absorber, a nucleating agent different from the above-described (A) and (B), a flame retardant, a flame retardant aid, a lubricant, a filler, a hydrotalcite, a fatty acid metal salt, an antistatic agent, a fluorescent brightener, a pigment, and/or a dye) may be incorporated within a range that does not markedly impair the effects of the present invention. The amount of the respective additives to be incorporated is as described above.

Next, the method of producing a polyolefin resin composition according to the present invention will be described. The method of producing a polyolefin resin composition according to the present invention includes the steps of: preparing the additive composition of the present invention, and incorporating the thus prepared additive composition of the present invention into a polyolefin resin such that the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 arts by mass of the polyolefin resin. The polyolefin resin composition produced by the production method of the present invention can impart excellent transparency and mechanical properties to its molded article. Further, the polyolefin resin composition produced by the production method of the present invention provides excellent productivity and quality stability in a kneading-extrusion process.

The step of preparing the additive composition of the present invention is not particularly restricted, and the additive composition can be prepared by, for example, the above-described method of producing the additive composition.

Further, a method of incorporating the additive composition of the present invention into a polyolefin resin is not particularly restricted, and a commonly-used method such as a method of dry-blending the polyolefin resin in a powder or pellet form with the additive composition of the present invention, or a method of preparing a masterbatch containing the additive composition of the present invention at a high concentration and subsequently adding the masterbatch to the polyolefin resin, can be employed.

In the polyolefin resin composition of the present invention, any known additive(s) (e.g., a phenolic antioxidant, a phosphorus-based antioxidant, a thioether-based antioxidant, other antioxidant, a hindered amine compound, an ultraviolet absorber, a nucleating agent different from the above-described (A) and (B), a flame retardant, a flame retardant aid, a lubricant, a filler, a hydrotalcite, a fatty acid metal salt, an antistatic agent, a fluorescent brightener, a pigment, and/or a dye) may be incorporated within a range that does not markedly impair the effects of the present invention. The amount of the respective additives to be incorporated is as described above.

Next, the molded article of the present invention will be described. The molded article of the present invention contains the polyolefin resin composition of the present invention, and has excellent transparency and mechanical properties.

The molded article of the present invention can be produced by molding the polyolefin resin composition of the present invention by a known molding method. Specific examples of the molding method include injection molding, extrusion molding, blow molding, vacuum molding, inflation molding, calender molding, slush molding, dip molding, and foam molding.

Specific examples of the molded article of the present invention include automobile materials, such as bumpers, dash boards, and instrument panels; housing applications, such as refrigerators, laundry machines, and vacuum cleaners; household articles, such as tableware, buckets, and bath goods; miscellaneous goods, such as toys; molded articles, including storage/preservation containers such as tanks; films; and fibers.

EXAMPLES

The present invention will now be described more concretely by way of Examples thereof; however, the present invention is not restricted to the following Examples and the like by any means.

Examples 1-1 to 1-6 and Comparative Examples 1-1 to 1-4

<Preparation of Additive Compositions>

A nonitol-based clarifying agent as a component (A), an aromatic phosphate metal salt as a component (B), a sorbitol-based clarifying agent, and a fatty acid lithium salt were added in accordance with the respective ratios shown in Table 1, and these materials were blended using a Henschel mixer at a blade rotation speed of 1,000 rpm for 5 minutes, whereby an additive composition was obtained. It is noted here that the unit of the amount of the respective components shown in Table 1 is parts by mass. The thus obtained additive composition was evaluated as described below.

<Method of Measuring Angle of Spatula>

An "angle of spatula" refers to an angle formed by the ridge line of a powder laver and the horizontal plane after a certain impact is applied to the powder layer and the powder layer subsequently aggregates or collapses. The smaller the angle of spatula, the superior the powder flowability. Specifically, superior powder flowability not only improves adhesion and aggregation of the additive composition in a raw-material hopper and a weighing feeder of an extruder but also makes it easier to implement a bridging measure, so that continuous production using the extruder can be performed in a stable manner.

The angle of spatula was measured using "MULTI TESTER MT-02" manufactured by Seishin Enterprise Co. Ltd. A spatula was inserted into a bottom part of a deposited layer of an additive composition of interest, and subsequently gently lifted and taken out of the powder layer. In this process, the angle of the powder pile deposited on the spatula with respect to the horizontal plane was measured as an angle of repose (°). Next, after lightly applying an impact on the spatula, the angle of repose (°) was measured in the same manner. An average value of the thus measured two angles of repose was determined as an angle of spatula (°), and this was used as an item for evaluating the powder flowability of the additive composition. The results thereof are shown together in Table 1.

TABLE 1

| | NX 8000[1] | Compound 1[2] | Fatty acid Li salt[3] | 3988[4] | (A)/(B) | Angle of spatula [°] |
|---|---|---|---|---|---|---|
| Example 1-1 | 80 | 20 | — | — | 80/20 | 75.3 |
| Example 1-2 | 80 | 18 | 2 | — | 82/18 | 77.0 |
| Example 1-3 | 80 | 15 | 5 | — | 84/16 | 76.5 |
| Example 1-4 | 50 | 45 | 5 | — | 53/47 | 71.1 |
| Example 1-5 | 20 | 53.3 | 16.7 | — | 27/73 | 75.8 |
| Example 1-6 | 20 | 72 | 8 | — | 22/78 | 77.8 |
| Comparative Example 1-1 | 100 | — | — | — | — | 78.4 |
| Comparative Example 1-2 | — | 90 | 10 | — | — | 79.6 |
| Comparative Example 1-3 | — | 66.7 | 33.3 | — | 0 | 79.2 |
| Comparative Example 1-4 | — | 15 | 5 | 80 | 0 | 78.9 |

[1]NX 8000: nonitol-based clarifying agent, trade name "MILLAD NX 8000J" manufactured by manufactured by Milliken & Company
[2]Compound 1: lithium-2,2'-methylene-bis(4,6-di-tert-butylphenyl)phosphate
[3]Fatty acid lithium salt: lithium salt of fatty acids including palmitic acid, stearic acid, and 12-hydroxystearic acid
[4]3988: sorbitol-based clarifying agent, trade name "MILLAD 3988" manufactured by Milliken & Company From Examples 1-1 to 1-6 and Comparative Examples 1-1 to 1-3, it was found that, as compared to those additive compositions in which a nonitol-based clarifying agent or an aromatic phosphate metal salt was solely incorporated, the additive compositions according to the present invention in which a nonitol-based clarifying agent and an aromatic phosphate metal salt were both blended had an improved powder flowability with a reduced angle of spatula. On the other hand, according to Comparative Example 1-4, the additive composition in which the nonitol-based clarifying agent was changed to a sorbitol-based clarifying agent did not show any improvement in the powder flowability.

Examples 2-1 to 2-4 and Comparative Examples 2-1 and 2-2

To 100 parts by mass of a homopolypropylene (melt flow rate: 8 g/10 min; 2.16 kg×230° C. according to ISO Standard 1133), 0.05 parts by mass of a phenolic antioxidant (tetrakis[methylene-3-(3',5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate, and each additive composition having the formulation shown in Table 2 were added, and these materials were mixed using a Henschel mixer at 1,000 rpm for 1 minute and subsequently melt-kneaded using a biaxial extruder at an extrusion temperature of 230° C. to granulate pellets. It is noted here that the unit of the amount of the respective components shown in Table 2 is parts by mass. The thus obtained pellets were dried at 60° C. for 8 hours, after which the flexural modulus and the heat deflection temperature under load (HDT) were measured under the below-described conditions. The results thereof are shown together in Table 2.

Examples 3-1 to 3-3 and Comparative Examples 3-1 and 3-2

To 100 parts by mass of a homopolypropylene (melt flow rate: 8 g/10 min; 2.16 kg×230° C. according to ISO Standard 1133), 0.05 parts by mass of a phenolic antioxidant (tetrakis[methylene-3-(3',5'-di-tert-butyl-4'-hydroxyphenyl)propionate]methane), 0.1 parts by mass of a phosphorus-based antioxidant (tris(2,4-di-tert-butylphenyl)phosphite), 0.05 parts by mass of calcium stearate, and each additive composition having the formulation shown in Table 3 were added, and these materials were mixed using a Henschel mixer at 1,000 rpm for 1 minute and subsequently melt-kneaded using a biaxial extruder at an extrusion temperature of 230° C. to granulate pellets. It is noted here that the unit of the amount of the respective components shown in Table 3 is parts by mass. The thus obtained pellets were dried at 60° C. for 8 hours, after which the haze was measured under the below-described conditions. The results thereof are shown together in Table 3.

<Flexural Modulus>

Using an injection molding machine (EC100-2A, manufactured by Toshiba Machine Co., Ltd.), the above-obtained pellets were injection-molded at a mold temperature of 50° C. and a resin temperature of 200° C. to prepare test pieces having dimensions of 80 mm×10 mm×4 mm. The thus obtained test pieces were left to stand for at least 48 hours in a 23° C. incubator, and the flexural modulus (MPa) was subsequently measured in accordance with ISO178 using a bending tester "AG-IS" manufactured by Shimadzu Corporation.

<HDT (Heat Deflection Temperature Under Load)>

Using an injection molding machine (EC100-2A, manufactured by Toshiba Machine Co., Ltd.), the above-obtained pellets were injection-molded at a mold temperature of 50° C. and a resin temperature of 200° C. to prepare test pieces having dimensions of 80 mm×10 mm×4 mm. The thus obtained test pieces were left to stand for at least 48 hours in a 23° C. incubator, and the HDT (° C.) was subsequently measured in accordance with ISO75 (load: 0.45 Mpa).

<Haze>

Using an injection molding machine (EC100-2A, manufactured by Toshiba Machine Co., Ltd.), the above-obtained pellets were injection-molded at a mold temperature of 50° C. and a resin temperature of 200° C. to prepare test pieces having dimensions of 60 mm×60 mm×2 mm. The thus obtained test pieces were left to stand for at least 48 hours in a 23° C. incubator, and the haze (%) was subsequently measured in accordance with ISO14782 using Haze Guard II (manufactured by BYK Additives & Instruments, Ltd.).

TABLE 2

| | NX 8000[1] | Compound 1[2] | Fatty acid Li salt[3] | (A)/(B) | Flexural modulus [MPa] | Heat deflection temperature under load [° C.] |
|---|---|---|---|---|---|---|
| Example 2-1 | 0.16 | 0.030 | 0.010 | 84/16 | 1,760 | 105.4 |
| Example 2-2 | 0.14 | 0.045 | 0.015 | 76/24 | 1,810 | 106.4 |
| Example 2-3 | 0.10 | 0.075 | 0.025 | 57/43 | 1,840 | 106.9 |
| Example 2-4 | 0.04 | 0.120 | 0.010 | 25/75 | 1,870 | 107.6 |
| Comparative Example 2-1 | — | — | — | — | 1,380 | 82.9 |
| Comparative Example 2-2 | 0.20 | — | — | — | 1,610 | 93.8 |

TABLE 3

| | NX 8000[1] | Compound 1[2] | Fatty acid Li salt[3] | (A)/(B) | Haze [%] |
|---|---|---|---|---|---|
| Example 3-1 | 0.10 | 0.075 | 0.015 | 57/43 | 46.2 |
| Example 3-2 | 0.10 | 0.090 | 0.010 | 53/47 | 46.1 |
| Example 3-3 | 0.04 | 0.144 | 0.016 | 22/78 | 40.4 |
| Comparative Example 3-1 | — | — | — | — | 89.3 |
| Comparative Example 3-2 | 0.20 | — | — | — | 46.7 |

From Examples 2-1 to 2-4 and Comparative Example 2-2 shown in Table 2 as well as Examples 3-1 to 3-3 and Comparative Example 3-2 shown in Table 3, it was found that those molded articles obtained by molding the polyolefin resin composition of the present invention which contained the additive composition of the present invention that was obtained by blending a nonitol-based clarifying agent and an aromatic phosphate metal salt had superior mechanical properties and transparency as compared to the molded articles obtained from a polyolefin resin composition containing only a nonitol-based clarifying agent.

From the above-described results, it was confirmed that the additive composition of the present invention has an excellent powder flowability and can impart excellent transparency and mechanical properties to molded articles.

The invention claimed is:

1. An additive composition, comprising:
(A) 1-[8-propyl-2,6-bis(4-propylphenyl)tetrahydro[1,3]dioxino[5,4-d]-1,3-dioxin-4-yl]ethane-1,2-diol; and
(B) an aromatic phosphate metal salt represented by the following Formula (1):

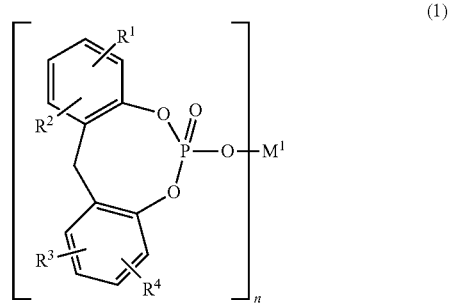

wherein $R^1$ to $R^4$ each independently represent an alkyl group having 1 to 6 carbon atoms; n is 1, and $M^1$ is lithium, and
wherein a mass ratio of (A) and (B), (A)/(B), present in the additive composition is in a range of 10/90 to 90/10.

2. The additive composition according to claim 1, further comprising a fatty acid metal salt, wherein the fatty acid metal salt is a compound represented by the following Formula (2):

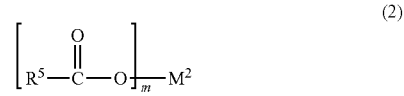

where $R^5$ represents a linear or branched alkyl group having 12 to 20 carbon atoms, which alkyl group is optionally substituted with a hydroxy group; $M^2$ represents an m-valent metal atom or $Al(OH)_{3-m}$; and m represents an integer of 1 to 3.

3. The additive composition according to claim 2, wherein, in Formula (2), m is 1, and $M^2$ is lithium.

4. The additive composition according to claim 1, further comprising at least one additive selected from a phenolic antioxidant, a phosphorus-based antioxidant, a thioether-based antioxidant, a hindered amine compound, an ultraviolet absorber, a nucleating agent, a flame retardant, a flame retardant aid, a lubricant, a filler, a hydrotalcite, an antistatic agent, a pigment, and a dye.

5. The additive composition according to claim 1, wherein the mass ratio of (A) and (B), (A)/(B), present in the additive composition is in a range of 70/30 to 30/70.

6. The additive composition according to claim 2, wherein the fatty acid metal salt is at least one selected from the group consisting of palmitic acid, stearic acid, and 12-hydroxystearic acid.

7. A polyolefin resin composition, comprising:
a polyolefin resin; and
an additive composition,
wherein
the additive composition is the additive composition according to claim 1, and
the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 parts by mass of the polyolefin resin.

8. A method of producing a polyolefin resin composition, the method comprising steps of:
(a) preparing the additive composition according to claim 1; and
(b) incorporating the thus prepared additive composition into a polyolefin resin such that the content of (A) 1-[8-propyl-2,6-bis(4-propylphenyl)tetrahydro[1,3]dioxino[5,4-d]-1,3-dioxin-4-yl]ethane-1,2-diol is 0.001 to 0.8 parts by mass with respect to 100 parts by mass of the polyolefin resin.

9. The method according to claim 8, further comprising steps of:
(c) feeding the composition obtained by step (b) to an extruder, and
(d) melt-kneading the fed composition.

10. A molded article, comprising the polyolefin resin composition according to claim 7.

* * * * *